(12) United States Patent
Bachmutsky et al.

(10) Patent No.: US 11,089,469 B2
(45) Date of Patent: Aug. 10, 2021

(54) SUBSCRIBER-DRIVEN SHARING OF A COMMUNICATIONS SERVICE

(71) Applicant: TELEFONAKTIEBOLAGET LM ERICSSON (PUBL), Stockholm (SE)

(72) Inventors: Alexander Bachmutsky, Sunnyvale, CA (US); Srinivas Kadaba, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 16/094,804

(22) PCT Filed: Apr. 21, 2016

(86) PCT No.: PCT/IB2016/052251
§ 371 (c)(1),
(2) Date: Oct. 18, 2018

(87) PCT Pub. No.: WO2017/182844
PCT Pub. Date: Oct. 26, 2017

(65) Prior Publication Data
US 2020/0296572 A1  Sep. 17, 2020

(51) Int. Cl.
*H04W 8/18* (2009.01)
*H04W 8/20* (2009.01)
(Continued)

(52) U.S. Cl.
CPC .......... *H04W 8/183* (2013.01); *H04W 8/205* (2013.01); *H04W 12/06* (2013.01); *H04W 12/35* (2021.01); *H04W 12/61* (2021.01)

(58) Field of Classification Search
CPC .......... H04W 8/183; H04W 12/00502; H04W 12/0023; H04W 8/205; H04W 12/06;
(Continued)

(56) References Cited

U.S. PATENT DOCUMENTS

2014/0101449 A1*  4/2014  Trujillo Gonzalez ...................... H04W 12/06
713/171
2015/0181024 A1*  6/2015  El Mghazli .......... H04B 1/3816
455/411

(Continued)

FOREIGN PATENT DOCUMENTS

CN   101222715 A   7/2008
CN   102037754 A   4/2011
(Continued)

OTHER PUBLICATIONS

Simless, Inc. at www.simless.com, retrieved on Oct. 18, 2018.
(Continued)

*Primary Examiner* — Farid Seyedvosoghi
(74) *Attorney, Agent, or Firm* — Sage Patent Group

(57) ABSTRACT

A system and method for facilitating service sharing (e.g., voice services, data services, multimedia services, etc.) in a network environment (100). In one example arrangement, upon receiving an input at a host subscriber device (302), a request is generated (306) to a host subscriber's service provider network (304) for instantiating a virtual subscriber identification module (vSIM) populated with the host subscriber's service profile with respect to a service. A guest user's authentication information is provided (354) for performing guest registration and remote provisioning (354, 502) for the vSIM, the remote provisioning including allocation of a temporary phone number and an IP address, which may be used in a mapping relationship for routing calls or sessions engaged by the guest (352) using a service shared with the host subscriber (302).

28 Claims, 7 Drawing Sheets

(51) Int. Cl.
*H04W 12/06* (2021.01)
*H04W 12/30* (2021.01)
*H04W 12/61* (2021.01)

(58) Field of Classification Search
CPC ..... H04W 88/02; H04W 12/04; H04W 76/00; H04W 72/12; H04W 72/04; H04W 74/04; H04W 72/0446; H04W 88/06; H04W 84/04; H04W 12/35; H04W 12/61; H04Q 2213/394; H04J 2203/0069; H04J 4/00; H04J 2203/0091; H04B 7/2123; H04B 7/2121; H04B 7/2615; H04B 2201/70726; H04B 7/2668; H04B 7/216; H04B 7/2618; H04L 5/26; H04L 1/0048; H04L 12/4604

See application file for complete search history.

(56) References Cited

U.S. PATENT DOCUMENTS

2016/0126995 A1* 5/2016 Li .................... H04W 4/00
455/558

2016/0135023 A1* 5/2016 Schmit ................ H04M 3/543
455/417

2017/0272933 A1* 9/2017 Zhao ...................... H04W 8/18

FOREIGN PATENT DOCUMENTS

| | | |
|---|---|---|
| CN | 102461271 A | 5/2012 |
| CN | 102917339 A | 2/2013 |
| CN | 104813695 A | 7/2015 |
| EP | 2076071 A1 | 7/2009 |
| WO | 2008040964 A2 | 4/2008 |
| WO | WO-2008040964 A2 * | 4/2008 ............ H04W 4/60 |
| WO | 2012174722 A1 | 12/2012 |
| WO | 2013097177 A1 | 7/2013 |
| WO | 2014209176 A1 | 12/2014 |

OTHER PUBLICATIONS

GSMA Intelligence, Analysis "Understanding SIM evolution", Mar. 2015, pp. 1-17.
First Chinese Office Action for Chinese Patent Application No. CN 201680086879.3 dated Feb. 3, 2021, 15 pages.

* cited by examiner

SUBSCRIBER-DRIVEN SHARING OF A COMMUNICATIONS SERVICE

CROSS-REFERENCE TO RELATED APPLICATIONS

This application is a national stage of International Application No. PCT/IB2016/052251, filed Apr. 21, 2016, which is hereby incorporated by reference.

FIELD OF THE DISCLOSURE

The present disclosure generally relates to communication networks. More particularly, and not by way of any limitation, the present disclosure is directed to a system and method for effectuating subscriber-driven sharing of a communications service including, e.g., voice and/or data services.

BACKGROUND

There are often situations when a user may wish to share another user's service. For example, the user may think "my device battery is low, so I wish I could route my calls to your phone temporarily", or "I am expecting an important call when I am en route to my meeting, but coverage is bad, so I wish I could route my calls to your phone in addition to mine", or "I am visiting here for only a few days, so it would be nice to be able to share a friend's service when I am traveling", and so on.

The communications service industry has hitherto ignored such problems and instead focused on larger solutions such as family share plans, expensive international roaming etc. However, there are a number of new "sharing economy" examples (Uber for transportation services and Airbnb for accommodation, for instance) that indicate there exists a potential for short-term sharing transactions in the area of communications services as well.

SUMMARY

The present patent disclosure is broadly directed to systems, methods, apparatuses as well as client devices and associated non-transitory computer-readable media for facilitating service sharing (e.g., voice services, data services, multimedia services, etc.) in a network environment. In one example arrangement, upon receiving an input at a host subscriber device, a request is generated to a host subscriber's service provider network for instantiating a virtual subscriber identification module (vSIM) populated with the host subscriber's service profile with respect to a service. A guest user's authentication information is provided using the vSIM for performing guest registration and remote provisioning for the vSIM, the remote provisioning including allocation of a temporary phone number and/or an Internet Protocol (IP) address, which may be used in a mapping relationship for routing calls or sessions engaged by the guest using a service shared with the host subscriber.

In one aspect, an embodiment of a system or apparatus, virtualized or otherwise, is disclosed for facilitating service sharing in a network environment. The claimed embodiment comprises, inter alia, one or more processors; and a persistent memory module coupled to the one or more processors, the persistent memory module including program instructions for performing the following acts when executed by the one or more processors: upon receiving a request from a host subscriber for instantiating a vSIM, authenticating the host subscriber by a host service provider network and generating a vSIM populated with the host subscriber's service profile with respect to one or more host services to which the host subscriber has a subscription and is requesting or has requested to share; downloading the vSIM to a host and/or guest subscriber device or otherwise associating the vSIM with the host/guest subscriber device in a cloud platform; upon receiving a guest user's credentials, performing guest registration and remote provisioning for the vSIM, the remote provisioning including allocation of a temporary phone number and an IP address that are attached to the vSIM-based host service(s), creating one or more mapping relationships relative to the temporary phone number and IP address for a duration of time; and propagating at least one of the mapping relationships to one or more location and routing databases of at least one of the host service provider network and a guest service provider network for facilitating routing of calls for the guest user using at least one of the vSIM-based host services.

In one example implementation, the time duration for which the mapping relations or associations may be maintained could be a time window manually configured, automatically configured, or remain unbounded for indeterminate amount of time or with some system overrides, or a duration that can be configured to be extended as needed, etc. In another variation, the associative relationship associated with mapping relations based on remote provisioning may be dependent on a preconfigured time limit that may be extended as needed. Also, in one aspect, the remotely-provisioned phone number could be the original number (e.g., guest's or the host's).

In a further aspect, an embodiment of a subscriber device configured for sharing services with a guest user is disclosed. The claimed embodiment comprises, inter alia, one or more processors; and a persistent memory module coupled to the one or more processors, the persistent memory module including program instructions for performing, when executed by the one or more processors, the following acts: upon receiving an input from a host subscriber, generating a request for instantiating a vSIM to a host service provider network; receiving a vSIM populated with the host subscriber's service profile with respect to one or more host services to which the host subscriber has a subscription and is requesting to share with one or more guests; and facilitating, using a guest user's credentials (e.g., input on the host subscriber device, initiation of a guest registration and remote provisioning process for the vSIM), the remote provisioning including receiving a temporary phone number and/or an IP address that are attached to the vSIM-based host service and mapped in one or more associative relationships to a number of parameters operative to facilitate routing as noted above.

In still further aspects, one or more embodiments of a non-transitory computer-readable medium containing computer-executable program instructions or code portions stored thereon are disclosed for performing one or more embodiments of the methods set forth herein when executed by a processor entity of a network node, a client UE device, and the like. Further features of the various embodiments are as claimed in the dependent claims appended hereto.

One or more embodiments of the present invention enable a host subscriber to advantageously provide the convenience of sharing a service to their friends and family in a timely fashion in the event the guests are unable to use their own service, which may be due to service outage, poor network quality, low battery on the device, etc. Further, an implementation of the present invention can provide a revenue opportunity for service providers by way of offering a service sharing service to its subscribers depending on billing arrangements for shared services. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
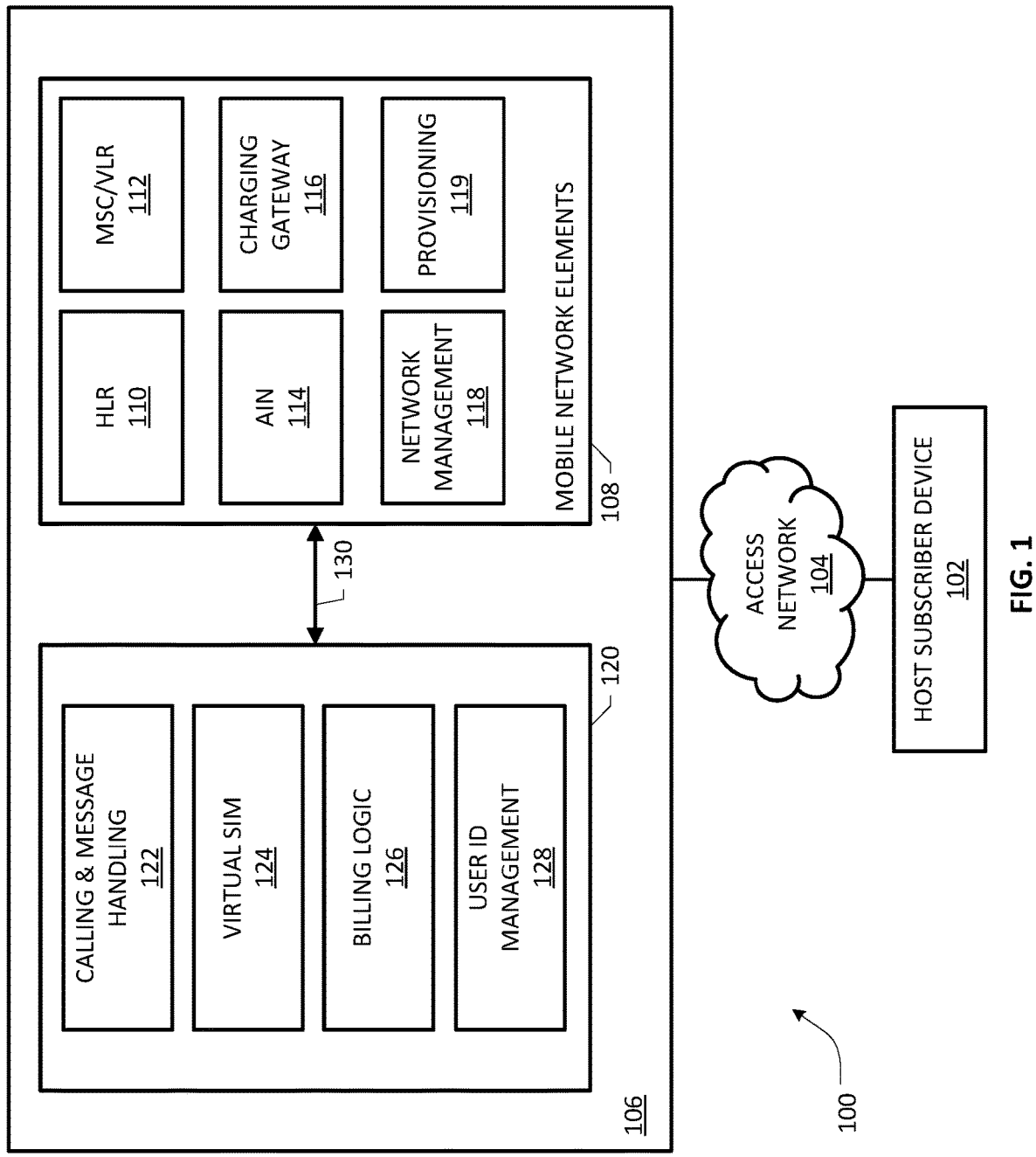
FIG. 1 depicts an example network environment wherein one or more embodiments of the present invention may be practiced for facilitating service sharing between a host subscriber and one or more guests using a host subscriber device.

In the following description, numerous specific details are set forth with respect to one or more embodiments of the present patent disclosure. However, it should be understood that one or more embodiments may be practiced without such specific details. In other instances, well-known hardware/software subsystems, components, structures and techniques have not been shown in detail in order not to obscure the understanding of the example embodiments. Accordingly, it will be appreciated by one skilled in the art that the embodiments of the present disclosure may be practiced without having to reference one or more such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services, either in a virtualized or non-virtualized environment, with respect to a plurality of subscribers and associated user equipment that are operative to receive/consume services (e.g., voice services, data services, media services, or any combination thereof, including an Over-The-Top (OTT) communications service, by way of illustration) in a network infrastructure adapted for providing services using a variety of access networks, one or more transmission technologies, architectures, communications protocols, etc. As such, some network elements may be disposed in wireline communications networks whereas other network elements may be disposed in wireless radio network environments. Further, an example communications network may be architected as a circuit-switched network, a packet-switched network or a combination thereof. Example subscriber end stations or client devices may comprise a variety of communications devices adapted for receiving/consuming services, e.g., including smartphones, multimedia/video phones, mobile/wireless user equipment with or without integrated subscriber identity/identification modules (SIMs), tethered/wireline phones, satellite phones, cordless phones, portable laptops, netbooks, palm tops, tablets, computers, etc. that can facilitate a voice telephony service, as well as gaming systems or consoles (such as the Wii®, Play Station 3®, etc.) that may be configured for receiving or placing voice/data calls, and the like, which may be adapted for facilitating service sharing in accordance one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network environment 100 wherein one or more embodiments of the present invention may be practiced for facilitating service sharing between a host subscriber, e.g., as represented by a communications device, customer premises equipment (CPE) or user equipment (UE) 102 associated therewith, generally referred to as "host subscriber device", and one or more guests using such a host subscriber device 102 for consuming or sharing a host subscriber's service. Network environment 100 may include a host service provider network infrastructure 106 operative with the host subscriber device 102 via a suitable wired/wireless access network 104 using any known or heretofore unknown technologies. As noted above, an example subscriber device 102 may broadly comprise any type of communications device based on a number of technologies that a host subscriber may use for consuming services according to one or more subscriber plans or profiles. Accordingly, where an example subscriber device 102 is provided as a wireless mobile communications device, it may include multi-band interfacing functionality compliant with at least one of a General Packet Radio Service (GPRS) network, an Enhanced Data Rates for Global System for Mobile Communications (GSM) Evolution (EDGE) network, a $3^{rd}$ Generation Partnership Project (3GPP)-compliant network (e.g., Universal Mobile Telecommunications System (UMTS) network, HSPA), a 4G network (e.g., Long Term Evolution (LTE) network), a 5G network, a Next Generation Network (NGN), an Integrated Digital Enhanced Network (IDEN), a Code Division Multiple Access (CDMA) network, a Time Division Multiple Access (TDMA) network, an IP Multimedia Subsystem (IMS) networks, etc. in addition to having short-range radio access based on a standard selected from at least one of IEEE 802.11 standard, IEEE 802.16 standard, HiperLan standard, HiperLan II standard, Wi-Max standard, OpenAir standard, Bluetooth standard, etc. Various mobile network elements 108 comprising an operator domain may comprise nodes or functionalities such as one or more network management nodes 118, provisioning node(s) 119, Advanced Intelligent Network (AIN) services node(s) 114, charging gateway node(s) 116, Home Location Register (HLR) node(s) 110, Visitor Location Register (VLR) node(s) and Mobile Service Switching Center(s) (MSCs) 112, and the like, that can interact with a service sharing platform 120 using standardized protocols and technologies such as SS7, HTTP, AAA (Authentication, Authorization and Accounting) protocols (e.g., Diameter, Radius protocols), etc. In one arrangement, the service sharing platform 120 may include nodes or functionalities such as user ID management node(s) 128, billing logic node(s) 126, calling and message handling node(s) 122, as well as a virtual SIM management node 124 that may be configured to facilitate service sharing between the host subscriber and one or more guest users as will be set forth in addition detail below.

As noted previously, the host subscriber may receive/consume various services using the subscriber device 102 (e.g., voice services, data services, circuit-switched network services, packet-switched network services, VOIP services, OTT services, etc.) including value-added services or AIN-based services such as, e.g., call screening, prepaid calling, toll free calling, account card calling, family group calling, private number plan services, prefix free dialing (for instance, when making calls from abroad), call distribution services based on various call criteria (location, time, calling party, etc.), home area discounting, reverse charging, call transfer, call queuing, and the like, according to one or more host subscriber service plans or profiles that may be provided or identified in association with a SIM module. One skilled in the art will recognize that SIMs may be implemented in one arrangement according to known Universal Integrated Circuit Card (UICC) standards based on the type of network (e.g., in a GSM network, the UICC may contain an application conventionally known as SIM, whereas in a UMTS network it may be provided as a USIM application, in a CDMA network it may be provided as a CSIM application, in an IMS network it may be provided as an ISIM application, and so on). Further, where a UICC card is provided with multi-network-compatible applications, it may be implemented as a removable user identity card or RUIM. For purposes of at least some embodiments of the present invention, the terms "SIM", "virtual SIM", "Soft SIM" or terms of similar import may be employed somewhat synonymously, and may generally encompass all such implementations regardless of which network technology is used in a service provider network.

Skilled artisans will further recognize that various nodes and functionalities set forth above with respect to the operator domain 108, service sharing platform 120, as well as access network elements (e.g., base station controllers (BSCs), base transceiver stations (BTSs), radio network controllers (RNCs), etc. may be virtualized using suitable network function virtualization (NFV) architectures implemented in a cloud-based environment. Additionally, certain aspects of the host subscriber device 102 may also be virtualized in a cloud and/or provided as software-centric applications that can be local (i.e., on the device). For example, a SIM or RUIM may be virtualized in a cloud and/or provided as a soft SIM or electronic SIM (or e-SIM). In a soft SIM or e-SIM implementation, a collection of software applications and data that perform all of the functionality of a SIM card/module may not reside in a hardware secure data storage module. Rather, the collection may be stored in the memory and processor of the subscriber device itself, i.e., there would be no SIM hardware layer. In an example implementation, the storage in the memory/processor of the device will also need to be appropriately secure. In a cloud-based implementation, the entire SIM application/functionality resided in the cloud, which may be owned/operated by the service provider or may be provided by a third-party entity (e.g., a private cloud storage service), wherein an association relative to the subscriber-to-SIM relationship is appropriately created/provisioned, updated and maintained. Likewise, additional device functionalities may also be suitably virtualized in certain implementations although it will be realized that virtualization of the host subscriber device 102 is not necessarily a requirement for practicing an embodiment of the present invention.

Figure 2B:
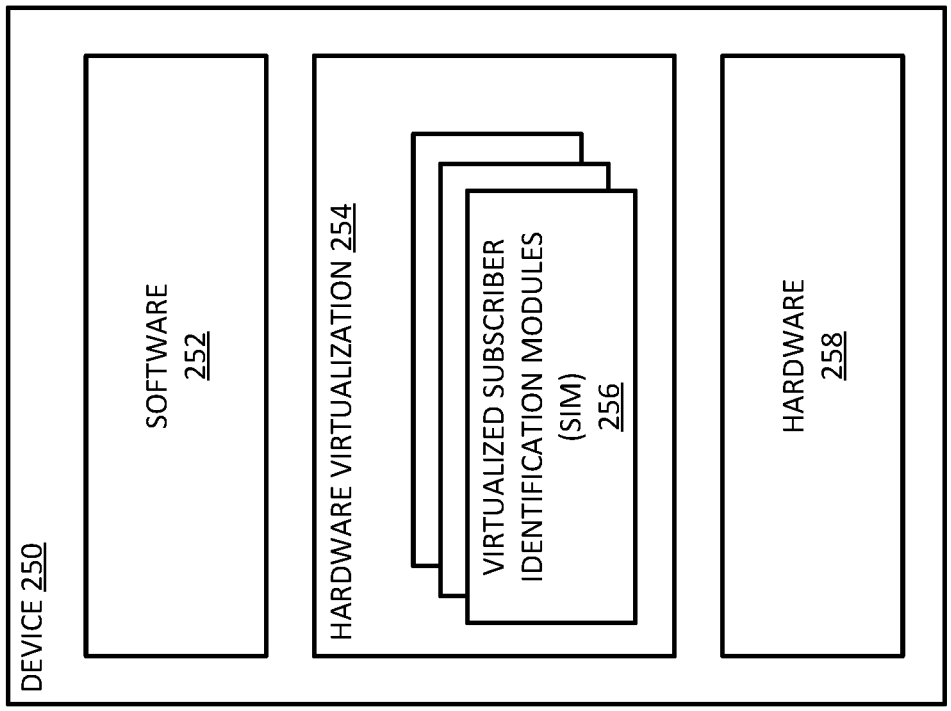
FIGS. 2A and 2B depict example arrangements of a host subscriber device that may be configured for sharing a service with a guest user according to an embodiment of the present invention.
Figure 2A:
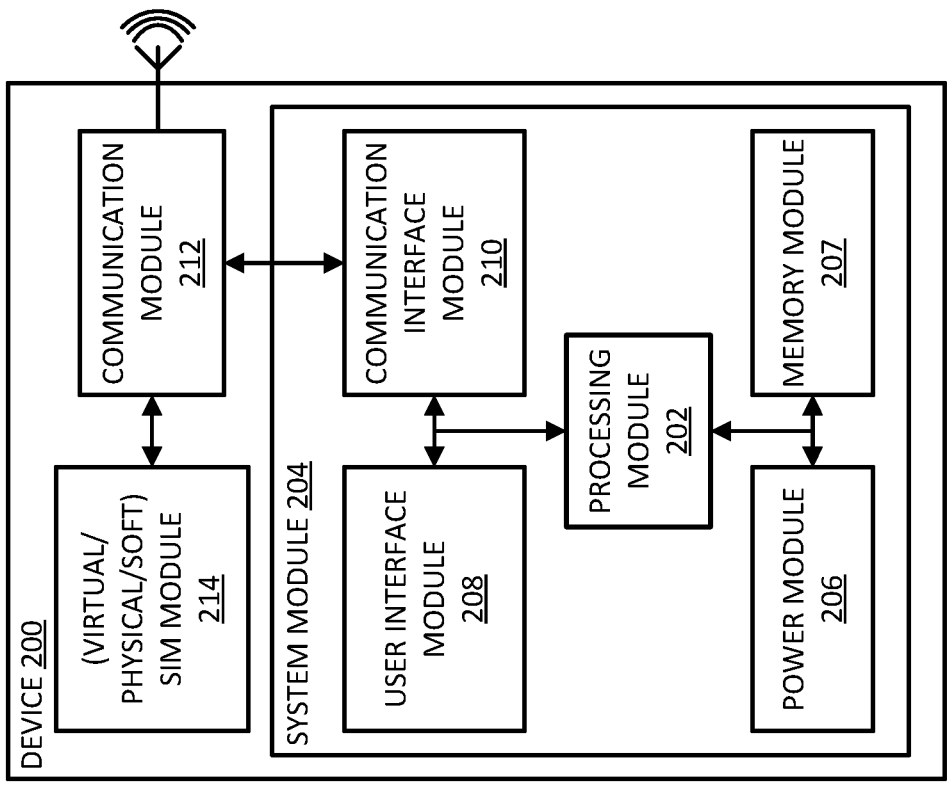

FIGS. 2A and 2B depict example arrangements of a host subscriber device that may be configured for sharing a service with a guest user according to an embodiment of the present invention. In particular, FIG. 2A illustrates an example configuration for a client UE device 200 that may be representative of host subscriber device 102 set forth hereinabove in accordance with at least one embodiment of the present disclosure. UE device 200 may comprise, for example, a system module 204 configured to handle general operations for device 200 and may include, for example, one or more processing modules or processors 202, one or more memory modules 207, one or more power modules 206, as well as a user interface module 208 and communication interface module 210, e.g., which may be further coupled to a communication module 212. One skilled in the art will recognize that communication interface module 210 and communication module 212 may form a communication subsystem that may include suitable transmitter/receiver (transceiver) functionality for effectuating single-mode, dual-mode, or multi-mode scanning and communications over a plurality of bands depending on radio technology. By way of example, one or more wide area wireless Tx/Rx modules as well as one or more wireless WLAN Tx/Rx modules that are compliant with one or more radio technologies exemplified above may be provided as part of such a communications subsystem. Additionally, although not specifically shown, it should be appreciated that each Tx/Rx module may include other associated components such as one or more local oscillator (LO) modules, RF switches, RF bandpass filters, A/D and D/A converters, signal processing modules and the like. UE device 200 may also comprise a physical or, virtualized, or soft SIM module 214 coupled to at least communication module 212. Whereas communication module 212 and SIM module 214 have been shown as separate from system module 204, it is also possible in some embodiments for some or all of the features associated with communication module 212 and/or SIM module 214 to be incorporated in system module 200.

Processing module(s) 202 may comprise one or more processors disposed as separate components, or alternatively, may comprise one or more processing cores embodied in one integrated circuit (IC), for example in a System-on-a-Chip (SOC) configuration, and circuitry configured to support the one or more processors that may be configured to run on any software platform including, e.g., a suitable operating system (OS) environment. Example circuitry configured to support the one or more processors may include interface or bridging circuitry that may be configured to handle communications between processing module 202, memory module 204 and other modules communicating on various wired and/or wireless buses in device 200. For example, bridging circuitry may be configured to handle the signaling between modules by converting from one type/speed of signaling to another, and may be further configured to be compatible with a variety of different devices to allow for different system implementations, upgrades, etc. Some of the functionality described above may also be incorporated within the one or more processors, memory module 204 or other system modules.

Processing module(s) 202 may be configured to execute instructions, which may include program code configured to cause processing module(s) 202 to perform activities such as, but not limited to, reading data, writing data, processing data, formulating data, converting data, transforming data, etc. in connection with executing instructions, data, etc., that may be stored in memory module(s) 204, e.g., for performing one or more device processes as will be set forth below. Memory module(s) 204 may comprise any type of volatile or nonvolatile memory modules based on semiconductor, magnetic, and/or optical storage technologies. Power module(s) 206 may include power sources that are internal to UE device 200 (e.g., a battery) and/or interfaces for obtaining power from external sources (e.g., AC power line, solar power, etc.), as well as any related circuitry configured to supply, regulate, modulate, adapt or convert power for operation of the device. User interface module or subsystem 208 may include circuitry configured to allow subscribers/users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.).

As previously noted, communications interface module 210 and communication module 212 may be configured to handle various types of wired/wireless communications including close-proximity wireless media (e.g., such as in the instance of RF identification (RFID) or Near-Field Communication (NFC), infrared (IR), optical character recognition (OCR), magnetic readers, etc.), short-range wireless media (e.g., Bluetooth, wireless local area networking (WLAN), Wi-Fi, etc.) and long range wireless mediums (e.g., cellular, satellite, etc.), in accordance with various standards and/or protocols.

Turning to FIG. 2B, UE device 250 is representative of a virtualized UE device such as device 200 set forth above that can be configured to operate as host subscriber device 102 shown in FIG. 1 for effectuating subscriber-driven sharing of a service according to an embodiment of the present invention. In general, virtualized UE device 250 may comprise, for example, software section or portion 252, hardware virtualization layer 254 including one or more virtualized SIM (vSIM) modules 256 and a hardware platform section 258. Hardware 258 may include the physical equipment portion of device 250 upon which software 252 may be executed for performing various tasks. In accordance with the teachings of the present disclosure, at least one vSIM may be provisioned with respect to a specific guest user such that the guest user may share or otherwise consume a particular service that the host subscriber may have. Broadly, the embodiments set forth herein enable host subscribers to directly share their services with one or more guest users via on-demand instantiation of virtual SIMs, preferably relying on procedures that are compatible with service providers' existing business processes according to one implementation. Various functionalities, modules, components or blocks for facilitating such service sharing may be grouped into the following: (i) Instantiation of virtual SIM for service sharing wherein the sharing user (i.e., the host subscriber or "sharer") instantiates a virtual SIM as a part of his/her service; (ii) Enabling of virtual SIM for service sharing whereby the host subscriber and/or service provider activates the virtual SIM and enables service sharing for a specified duration; (iii) Registration of the guest user and device wherein the guest user (also referred to as a shared user or a "sharee") and the UE device are registered with the service provider using the shared SIM and user identity verified, which completes authentication and authorization, thereby resulting in a temporarily assigned phone number and IP address; (iv) Call and data session routing mechanisms for routing calls or data sessions to the right phone number or IP address for the guest user; and (v) Termination of sharing whereby the host, service provider, or shared user can invoke a procedure to terminate the sharing service. The foregoing aspects will be described in further detail below by taking reference to the remaining drawing Figures.

Figure 3A:
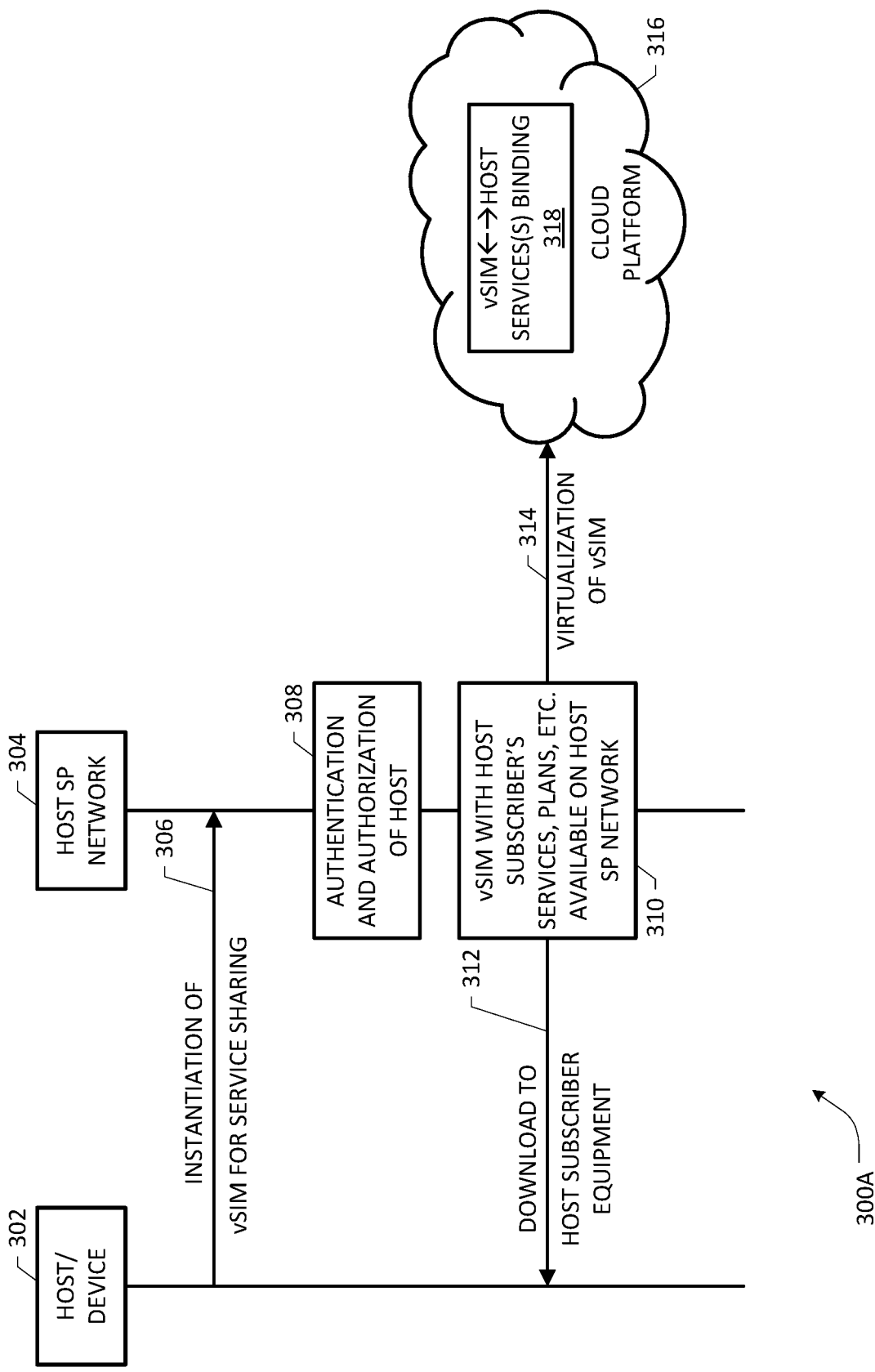
FIGS. 3A and 3B depict example message flow diagrams for facilitating service sharing according to an example embodiment of the present invention.
Figure 3B:
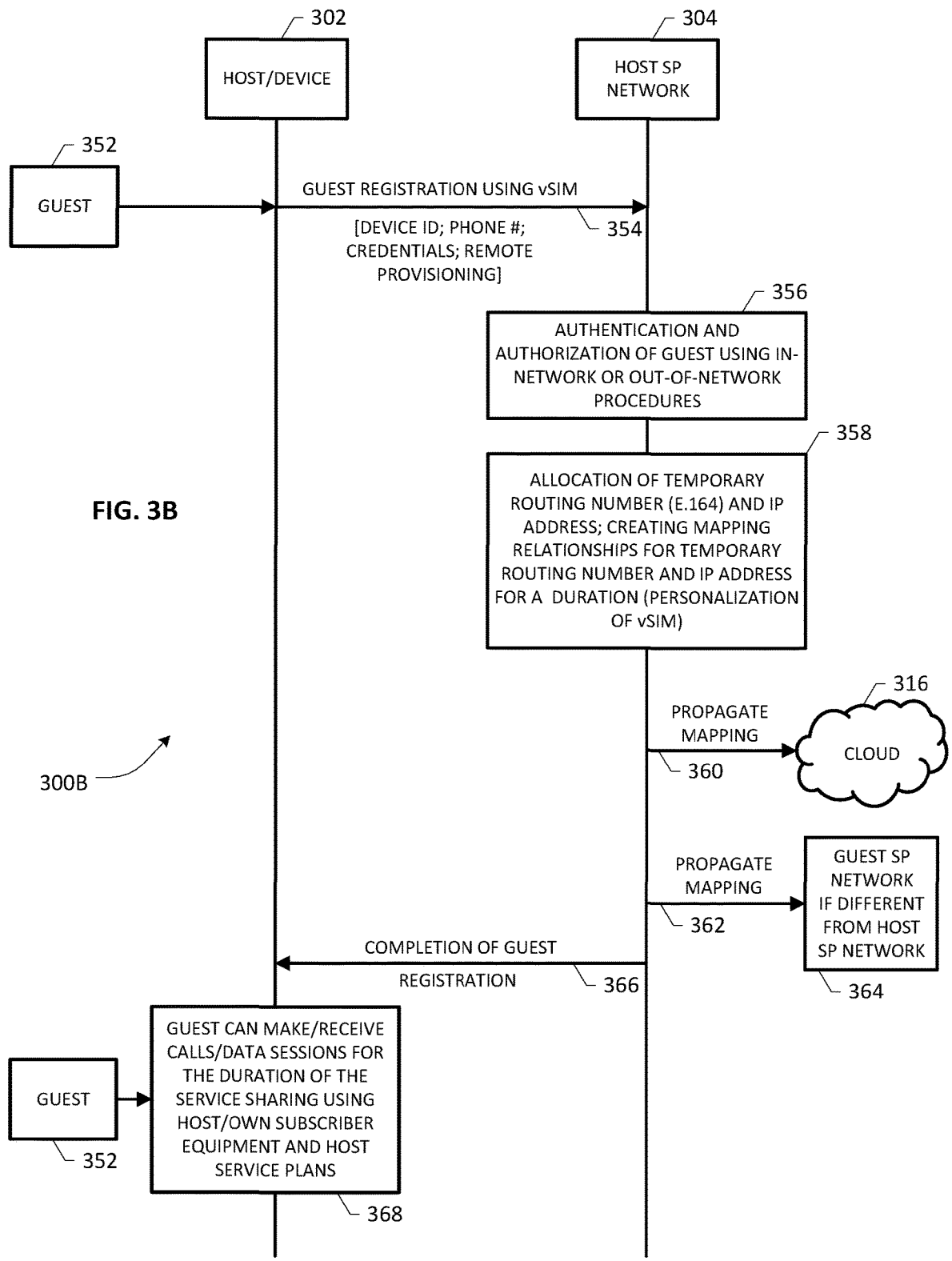
Figure 4:
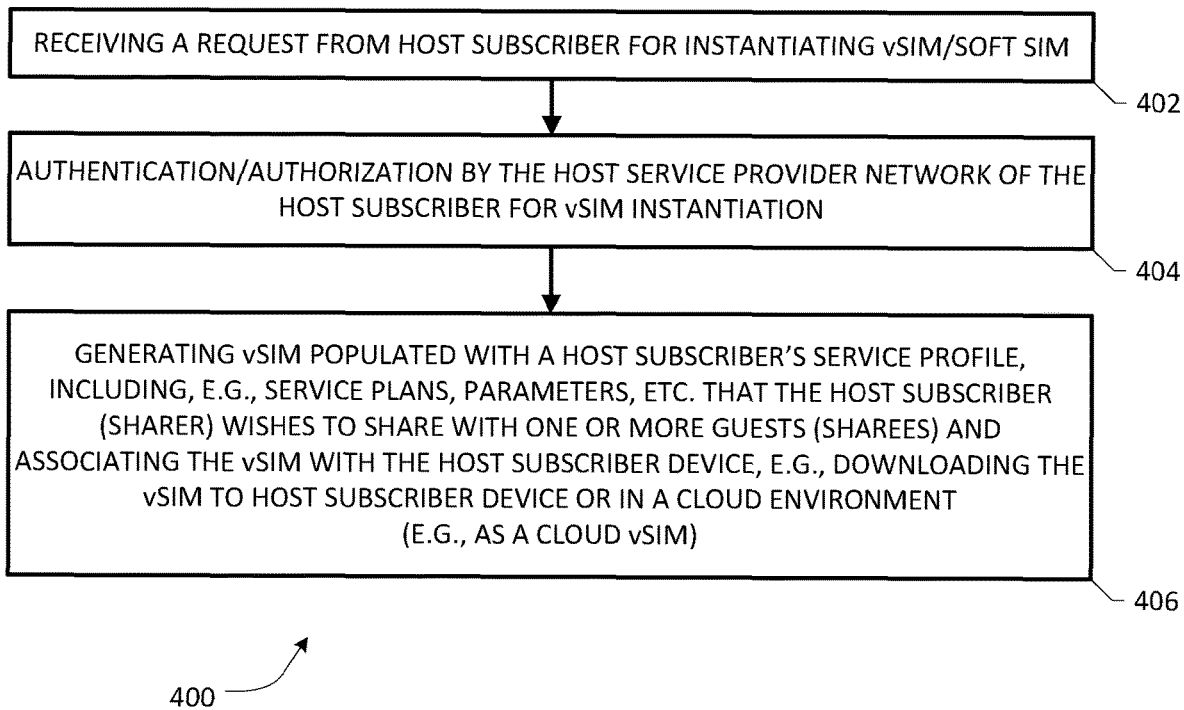
FIG. 4 depicts a flowchart of steps, acts, blocks and/or functions that may take place in connection with the message flow of FIG. 3A according to an example embodiment of the present invention.
Figure 5:
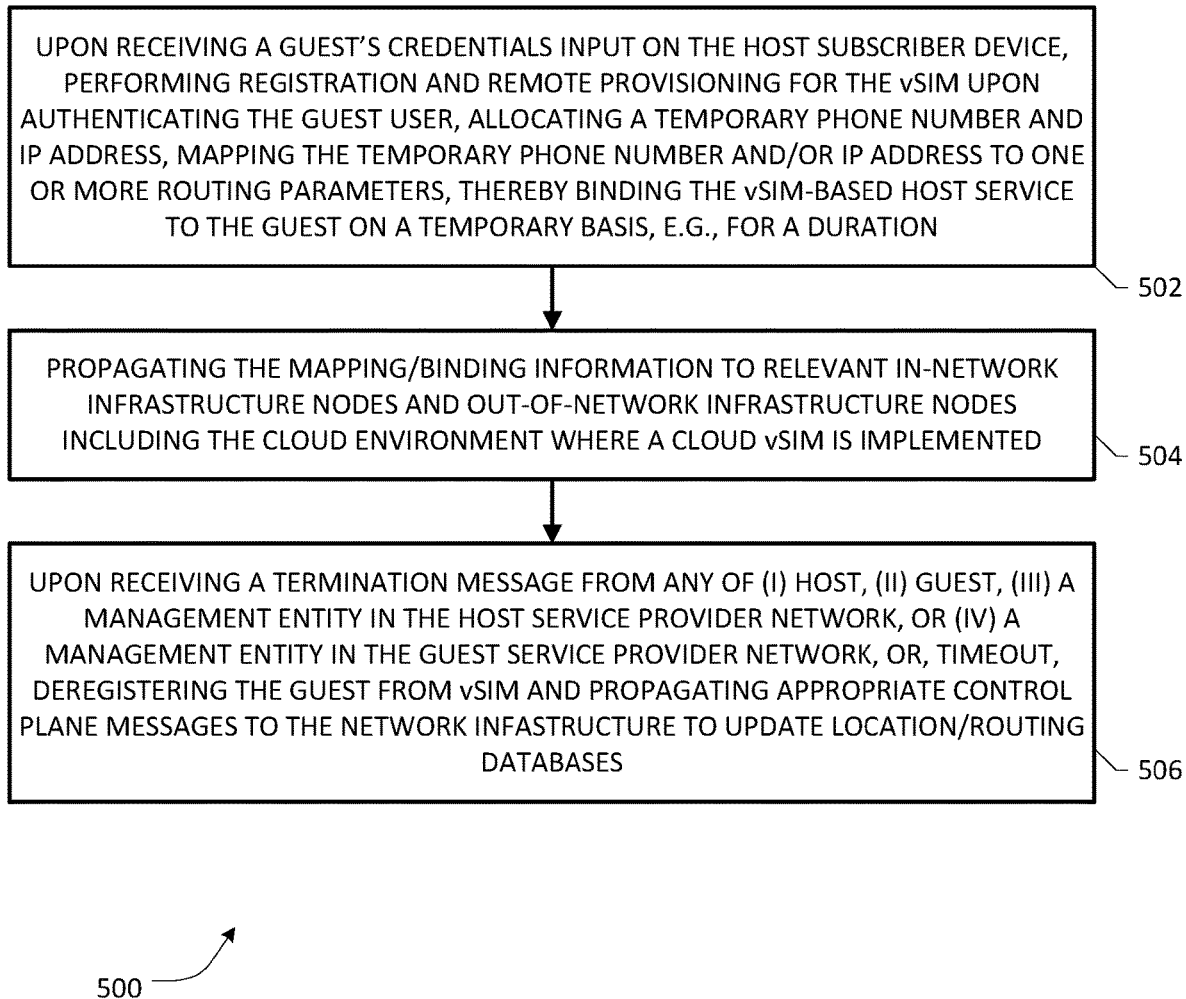
FIG. 5 depicts a flowchart of steps, acts, blocks and/or functions that may take place in connection with the message flow of FIG. 3B according to an embodiment of the present invention.

FIGS. 3A and 3B depict example message flow diagrams 300A/300B for facilitating service sharing according to an embodiment of the present invention. FIG. 4 depicts a flowchart of steps, acts, blocks and/or functions of a process 400 that may take place in connection with the message flow of FIG. 3A according to an example embodiment of the present invention. FIG. 5 depicts a flowchart of steps, acts, blocks and/or functions of a process 500 that may take place in connection with the message flow of FIG. 3B according to an embodiment of the present invention. Taking these Figures together, reference numeral 300A in FIG. 3A generally refers to a message flow between a host subscriber/device 302 (which is representative of device 102 in FIG. 1 and/or devices 200/250 in FIGS. 2A/2B described above) and the host's service provider network 304 that may comprise a network infrastructure 106 shown in FIG. 1. The host subscriber initiates a request 306 for instantiation of a vSIM or soft SIM for service sharing using the subscriber's device, which may be propagated to and received by an appropriate control and management node of the service provider network as set forth in block 402. In one variation, such a request may include or identify a specific service to be shared, time duration for sharing, among other parameters, indicia, etc. Further, the service provider network 304 may engage (optionally or otherwise in one example implementation) in a suitable authentication/authorization procedure to verify that the host subscriber is authorized for service sharing and vSIM instantiation (blocks 308, 404).

Responsive to the vSIM instantiation request (and upon determining that the host subscriber is properly authorized/authenticated), a vSIM may be generated that may be preferably populated with information relative to at least a portion of the host subscriber's service profile, including, e.g., service plans, parameters, etc., which the host subscriber (sharer) wishes to share with one or more guests (sharees), as set forth at blocks 310, 406. An associative mechanism may be engaged for binding the vSIM with the host subscriber device, e.g., downloading the vSIM to host subscriber device (e.g., as a soft SIM) or in a cloud storage/service environment (e.g., as a cloud vSIM). Accordingly, a device SIM downloading path 312 and a cloud virtualization path 314 are respectively illustrated in FIG. 3A, wherein a cloud platform 316 is operative to host a vSIM service binding database 318 with respect to the shared services of the host subscriber(s). As will be described below, the downloading path 312 may also represent downloading the vSIM to a guest user's device under certain conditions or scenarios.

Reference numeral 300B in FIG. 3B is illustrative of message flows relative to a scenario where a guest user 352 (e.g., a user visiting the host for a duration of time) may be enabled to share a host subscriber's service according to an embodiment. As noted previously, this time duration may be implemented in a number of ways, including, e.g., as a preconfigured duration that may be extended when the need arises, etc. In one implementation, the guest 352 or the host 302 may initiate a number of operations with respect to performing a guest registration process and remote provisioning using vSIM as indicated by message flow 354. For example, the guest's credentials including but not limited to guest name, identity, telephone number, Personal Identification Number (PIN) or password or other authentication indicia, device ID, etc. may be input on the host subscriber device. Alternatively, such information may also be transmitted to the host subscriber device from the guest user's device using NFC or other device-to-device communications. In a still further variation, a challenge/response mechanism may be provided with respect to the guest user wherein appropriate credentials and/or other response input may be supplied. Regardless of how the guest user information is received, transmitted or obtained, at least a portion of the information may be used for authentication and authorization of the guest user, either via in-network or out-of-network procedures as set forth in block 356. Accordingly, upon receiving the guest's credentials, registration of the guest user and remote provisioning for the vSIM may be performed upon authenticating the guest user, whereby a temporary phone number and IP address is allocated. Thereafter, one or more mapping relationships or correspondence may be, created, generated or otherwise obtained relative to the provisioned temporary phone number and/or IP address information and a plurality of parameters such as at least one of, including but not limited to, host service provider ID, guest location, host device ID, guest device ID, guest's original phone number etc., thereby binding the vSIM-based host service(s) to the guest for "personalizing" the vSIM on a temporary basis, as set forth in blocks 358, 502. In accordance with the teachings of the present information, such mapping relationships may be propagated to suitable network infrastructure elements for facilitating appropriate routing of call and data sessions involving any shared services without violating extant normal call/session setup/routing protocols, procedures, techniques and methodologies. Furthermore, whereas some mapping relationships may be applied in the host subscriber provider (SP) network, other mapping relationships may be applied in network infrastructures other than the host SP network, for example, the guest SP network or some other third-party network(s).

In one implementation, an example mapping relationship that may be applied at the host SP network infrastructure may comprise the following: {Host-SP assigned temporary allocated phone number}↔{Guest location; Guest temporary IP address}. It should be appreciated that "location" in this mapping relationship could be implicit, because the host SP network is aware of the guest's real-time location using other mechanisms such as GPS, triangulation, etc. An example mapping relationship that may be applied at the guest SP network may comprise the following: {Guest original phone number}↔{Host SP network ID; Guest location; Guest temporary IP address}. A still further mapping relationship may comprise: {Guest original phone number}↔{Host-SP assigned temporary allocated phone number; Guest temporary IP address}. A still further mapping relationship may comprise: {Guest original phone number}↔{Host SP network ID; temporary allocated phone number}. For VoIP calls, an example mapping relationship could be: {Guest original SIP URL}↔{Host SP network ID; Guest temporary SIP URL}. In one or more of such mapping relationships, device IDs of the host and/or guest, depending on vSIM instantiation, may also be provided in certain additional or alternative embodiments. In FIG. 3B, reference numerals 360 and 362 refer to appropriate network communication messages that may be effectuated for propagating suitable mapping information to the cloud platform 316 and/or other network infrastructure domains and elements, e.g., the guest's home network including HLR/VLR nodes, etc., as set forth in blocks 364, 504. In one embodiment of the present invention, a registration completion message 366 may be provided to the host subscriber device 302 to inform the guest and/or the host that the guest has been registered and allowed to use the host subscriber device and share/consume the designated shared service. For example, the guest 352 can make/receive voice/data calls or sessions using the host subscriber equipment and shared host service(s) as per the host subscriber plan(s) applicable to the shared services (block 368). In a further example, it is possible to enable using the host services on the guest device also, if so desired, depending on vSIM instantiation. That is, in such an illustrative scenario, the guest's device is operational but the guest desires to use/share the host services on his/her device. As noted elsewhere in the present patent application, in such an alternative embodiment, the guest device could be used, depending on availability, operational status, as well as the desire to consume/share host services on the original device. It should be therefore appreciated that in case when the guest device cannot physically be used (no battery, wrong frequencies, etc), the host device will be used. In other cases, guest device could be utilized.

A termination procedure may be implemented wherein a suitable termination message may be issued in one optional arrangement from or by any of the host, the guest (e.g., either using the shared host subscriber device or from some other UE belonging to the host or the guest), a management entity in the host service provider network and/or in the guest's home network, or responsive to a predefined timer mechanism, etc., whereupon the guest may be deregistered from the vSIM. Further, appropriate control plane messages may be generated and propagated through the service provider networks' infrastructures and/or associated cloud platforms to update the mapping relations, location databases, etc., pursuant to the deregistration of the guest, as set forth at block 506 of process 500. In further variations, the vSIM can also be destroyed as a part of the deregistration process. It could be that vSIM is created once and then mapped to a guest when needed, or vSIM is created every time the service sharing is initiated for one or more guests.

One skilled in the art will recognize that at least portions of the foregoing acts, functions, blocks and processes may be performed by one or more nodes of the service network provider network (e.g., network elements associated with infrastructure components 108, 120), or by the subscriber device 102, 200, 250 operating as a host/guest device, or in combination thereof, wherein suitably configured processor module(s) may be adapted to execute stored program instructions to facilitate subscriber-driven service sharing as set forth herein. An example network node, element, subsystem or apparatus may comprise an embodiment set forth in FIGS. 6A/6B described below, with or without virtualization.

Additional aspects and variations relative to the foregoing teachings may be set forth as follows. For example, in one variation, the sharing user or host subscriber device may be configured to invoke a procedure to instantiate the vSIM or soft SIM for service sharing only in case where there isn't one already created. The host subscriber may also provide the sharee or guest user's device ID to the operator, or alternatively provide the guest user with a specifically generated link to the soft SIM. Following this, the soft SIM may be securely provisioned on the to-be-shared device when alternative connectivity is available. Among various available possibilities, the following implementations are illustrative: (i) The device can be on WiFi and connect to a specific server to download the soft/vSIM, e.g., using procedures similar to the procedures used for downloading secure certificates and the like; (ii) An emergency channel can be used to send the soft/vSIM as a Short Message Service (SMS) message or a Multimedia Message Service (MIMS) message, which the user may accept to install on the device; (iii) A peer-to-peer (P2P) mechanism can be used for the primary sharing user to provide the shared user/device with the soft SIM. As noted previously, P2P WiFi, Quick Response (QR) code sharing, and NFC are examples of such P2P mechanisms.

In one implementation, the sharee/user may invoke a soft SIM installation procedure for enabling remote provisioning. Skilled artisans will appreciate that this can be easily accomplished with an application on the host's and/or guest's subscriber device. Furthermore, it may be noted that the application need not be provided as a smartphone app. For example, via the use of SMS/MMS and known remote provisioning mechanisms in use by service providers, this can be accomplished on older feature phones as well. With respect to the registration of the shared service user and device in one implementation of the present invention, invoking a remote provisioning mechanism for the soft/vSIM may initiate authentication and authorization procedures for the newly instantiated soft/vSIM and device at one or more various network infrastructure elements, possibly including third-party or private party elements in some embodiments. An example remote provisioning mechanism may follow known procedures, and on successful authentication of the soft/vSIM, the network system may provide the device with temporary routing indicia, e.g., an E.164 phone number and/or an IP address as noted previously. While this may be a default practice in an example implementation, it should be appreciated that it is possible for the sharing user to suggest or provide the phone number, or even for the shared service user to request one. Of course, whether the system can actually grant this or not may depend on service provider constraints (e.g., whether the requested number is within the service provider's allowed range, is it already assigned to someone else, and such).

As noted previously, embodiments of the present invention may be practiced in conjunction with all existing mechanisms for routing voice calls and data sessions. Accordingly, suitable control signaling for routing to the shared device over the air interface can be applied in an embodiment of the present invention without modifications. With respect to termination of a shared service, it should be noted that various implementations may be invoked as pointed out earlier. For example, the sharing host subscriber, shared service user or guest, or service provider, or a predefined timer, or any other event trigger on the end-user or operator device can invoke known procedures to dissociate the soft/vSIM from the shared service user and associated device, thus terminating the sharing of a designated service. Additional examples include sharing time expiration, returning to the pre-configured coverage or battery level (e.g., with respect to shared subscriber device and/or the guest's device), with potential hysteresis parameters to prevent frequent sharing initiation/termination procedures, especially in fully automatic systems.

In an example routing scenario, consider the following situation: Host/Guest device with new vSIM, Host SP-assigned temporary phone number, and temporary IP address. It should be appreciated that data communication may not involve the guest SP at all, as the requisite communication paths may be routed via the host SP. Also, calls to the temporary number/address go directly via the host service provider; guest network is not involved at all. As set forth previously, the host SP updates its VLR, i.e., it will add the required information into its VLR and sends the required mapping information to the guest SP with Guest ID. Calls to original/home Guest number will go to Guest SP, which will route the call to Host SP based on the above mapping. If no mapping is provided for any reason, such calls may be routed to a suitable process handling the "party unavailable" logic (e.g., voicemail) within the guest SP; this is an example case when service sharing is enabled, but only with Host SP assigned temporary number. Calls to original/home host number will go to Host SP as before, and based on Host device (when vSIM is installed on Host device) and/or Host SP policies and capabilities, they may be either routed as before (allowing simultaneous Host and Guest services), or re-routed to "unavailable"/"busy" logic (such as voicemail) as noted above.

Another example scenario may involve: Host/Guest device with new vSIM, Guest SP-assigned (probably, Guest original) phone number, Host SP-assigned temporary IP address. This is a scenario when Guest does not want a new phone number. Again, communications may not involve Guest SP at all; everything may be routed via Host SP, similar to the processes above. Calls to the Guest original phone number will go via the Guest SP similar to the above and will be handled based on mapping (if provided by Host SP). If no mapping is provided, the shared service will be a data service only. Accordingly, in a scenario where the Host SP communicates with the Guest SP, the routing may involve a typical roaming scenario based on a handshake and business agreement between service providers.

Another possibility is a "roaming lite" service that the Guest home SP offers, but does not need a handshake with the Host SP. The guest user communicates his/her temporary whereabouts (phone number and network ID, no need for IP address) with the guest home SP. The HLR/VLR in the guest home SP maintains a mapping to the new phone number. When an incoming call arrives with the guest's original home number as destination, the HLR/VLR responds to the calling infrastructure with a call redirect and offering the guest's temporary number. The calling HLR/VLR then simply redirects the call to the Guest's temporary number in the Host SP.

It should be further understood that in certain other additional or alternative embodiments, the temporary IP address need not be included in any mapping. In such scenarios, IP routing may be employed in combination with the teachings herein. For example, the user can register their SIP URL with the new HLR/VLR/CSCF or some other call handling/routing function even in VoIP. Voice call routing in this scenario works similar to a scenario set forth above. A potential issue that may arise is if the SIP URL for the user is granted by the Guest SP, in which case they own it. In that case, the routing will be similar to one where the Guest SP needs to map the original SIP URL to the temporary SIP URL.

It will be appreciated that in certain example scenarios Guest SP processing may not involve Guest temporary number. In fact, in certain arrangements, the guest SP infrastructure may not even be aware of that information. Rather, the guest SP infrastructure cares only about Host SP (and the fact that there is an agreement between Guest and Host SP to support such calls and revenue sharing model for such call) and Guest temporary IP address for facilitating call routing regardless of whether a shared service vSIM could be either on Host or Guest device. As to the Guest SP applicable mapping, one implementation may involve the Guest SP infrastructure potentially updating Guest status in HLR as "roaming". Also, it should be noted that Guest might choose (or Host SP might decide for whatever reason) not to have Host SP assigned temporary phone number; in such a case it will be reachable for phone calls only via the original Guest SP assigned phone number using one of the additional mapping relationships set forth hereinabove. Further, there is no need in any phone number mapping for the purpose of pure data service, as the temporary IP address will be used for that.

In terms of sharing agreements, if the Host SP and the Guest home SP share a roaming agreement, and the user has purchased roaming services, appropriate mapping relationships may be automatically exchanged between the SPs. If there is no business agreement, or if the guest chooses to purchase only "roaming lite", the guest user provides the mapping to the guest home SP using a special interface from the phone to some user service portal that populates the mapping into the HLR/VLR for circuit voice or the CSCF for VoIP.

Further, it should be understood that IP address and/or location need not be included in certain mappings. As noted elsewhere, even for VoIP only the SIP URL need be exchanged in an example scenario. The CSCF in the Host SP already maintains an internal map {Guest temporary SIP URL}↔{Guest temporary location; Guest temporary IP address} and therefore can reach the user device with plain old IP routing. As to location information, once the Host SP ID is available, calls get routed to the Host SP, which would know the location using well established air interface techniques such as LA update in GSM/EDGE, RA update in UMTS HSPA, and TA update in LTE, etc. In general, the mappings that the Host SP maintains for the guest's temporary whereabouts may all be provided as internal, since the Host SP ID, guest location, guest IP address, etc. are all available.

In a still further embodiment, a subscriber device (Host/Guest device) may have multiple SIMs available concurrently (e.g., one original, one shared service vSIM), for example, as illustrated in device 250 of FIG. 2B. Accordingly, when someone uses that device for phone calls or data connections, suitable logic may be provided in order to enable the user to select the context in which the request is handled—e.g., original vs. shared service—in accordance with an embodiment of the present invention. For instance, it can be accomplished by direct end-user selection using GUI, or via some automated process implemented on the device.

One skilled in the art will further recognize that various apparatuses, subsystems, functionalities/applications and/or one or more network elements as well as the underlying network infrastructures set forth above for facilitating subscriber-driven service sharing may be architected in a virtualized environment according to a network function virtualization (NFV) architecture in additional or alternative embodiments of the present patent disclosure. For instance, various physical resources, services, applications and functions executing within an example network environment, e.g., network environment 100 in FIG. 1, may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Accordingly, at least a portion of an example network architecture disclosed herein may be virtualized as set forth above and architected in a cloud-computing environment comprising a shared pool of configurable virtual resources. Various pieces of software, e.g., call processing software, vSIM instantiation, remote provisioning and user authentication, etc., as well as platforms and infrastructure of a network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like. Set forth below are some example embodiments relative to service sharing in the context of a virtualization/cloud architecture described above.

Figures 6A, 6B:
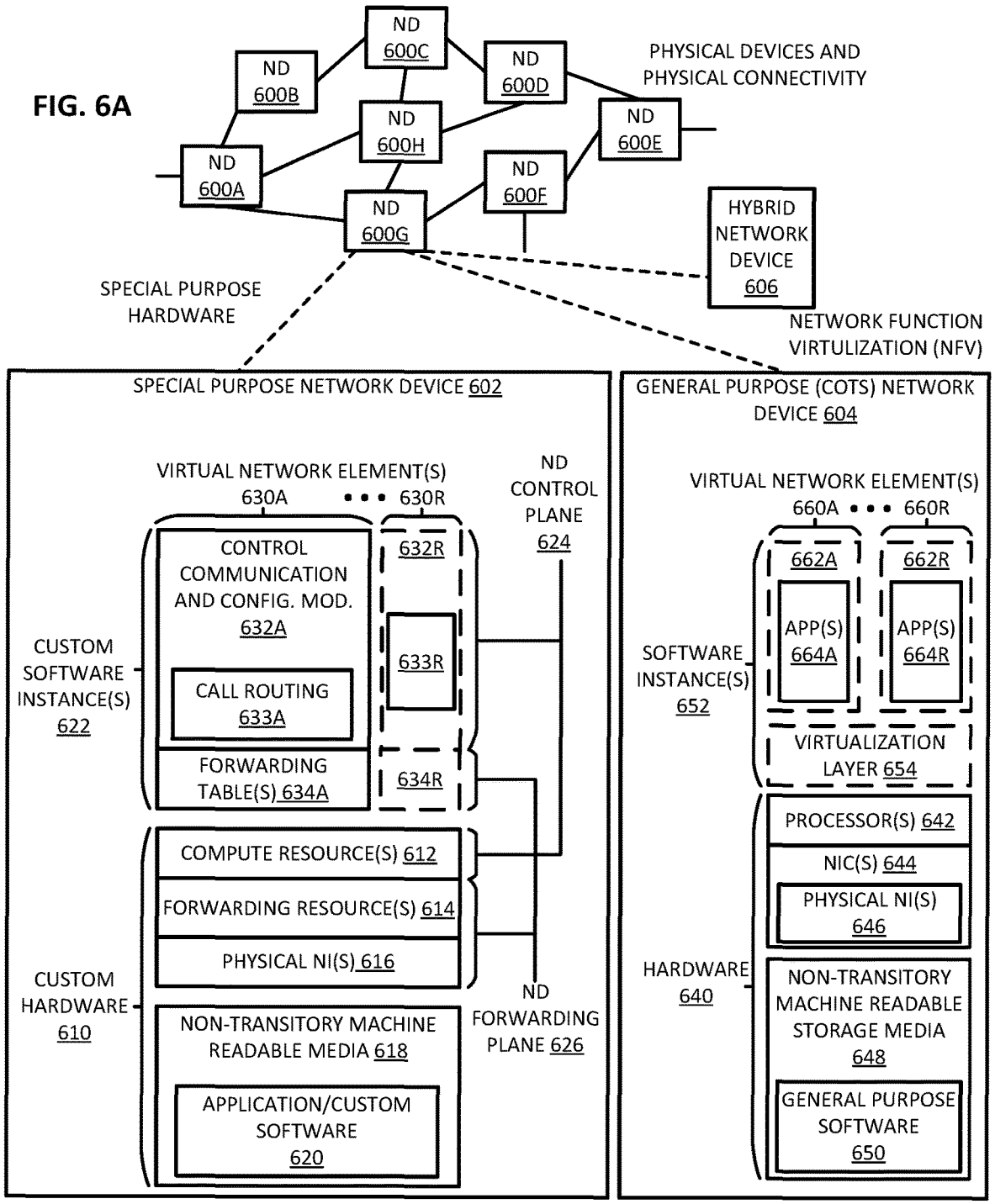
FIGS. 6A and 6B illustrate connectivity between network devices (NDs) within an exemplary network, as well as three exemplary implementations of the NDs, according to some embodiments of the invention wherein at least one or more portions of the network environment shown in FIG. 1 may be implemented in a virtualized environment.

FIGS. 6A and 6B illustrate connectivity between network devices (NDs) within an exemplary network, as well as three exemplary implementations of the NDs, according to some embodiments of the invention wherein at least one or more portions of the network environment shown in FIG. 1 may be implemented in a virtualized environment.

In the examples herein, a network device (ND) may be an electronic device that communicatively interconnects other electronic devices on the network (e.g., other network devices, end-user devices). Some network devices may be configured as "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 6A illustrates connectivity among a plurality of network devices (NDs) within an exemplary network, as well as three exemplary implementations of the NDs, according to some embodiments of the invention. In particular, FIG. 6A shows NDs 600A-H, which may be representative of carrier network switching elements, access network elements, Selective Routers, Location Databases, media gateways (MGWs), Call Session Control Function (CSCF) nodes, as well as the network elements provided as part of the infrastructure components 108, 120 shown in FIG. 1, and the like, wherein example connectivity is illustrated by way of lines between A-B, B-C, C-D, D-E, E-F, F-G, and A-G, as well as between H and each of A, C, D, and G. As noted previously, such NDs may be provided as physical devices, and the connectivity between these NDs can be wireless or wired (often referred to as a link). An additional line extending from NDs 600A, E, and F illustrates that these NDs act as ingress and egress nodes for the network (and thus, these NDs are sometimes referred to as edge NDs; while the other NDs may be called core NDs).

Two of the exemplary ND implementations in FIG. 6A are: (1) a special-purpose network device 602 that uses custom application—specific integrated—circuits (ASICs) and a proprietary operating system (OS); and (2) a general purpose network device 604 that uses common off-the-shelf (COTS) processors and a standard OS.

The special-purpose network device 602 includes appropriate hardware 610 (e.g., custom or application-specific hardware) comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein suitable application-specific software or program instructions 620 (e.g., switching, routing, call processing, etc). A physical NI is hardware in an ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the application software 620 may be executed by the hardware 610 to instantiate a set of one or more application-specific or custom software instance(s) 622. Each of the custom software instance(s) 622, and that part of the hardware 610 that executes that application software instance (be it hardware dedicated to that application software instance and/or time slices of hardware temporally shared by that application software instance with others of the application software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R with respect to suitable application/service instances 633A-R, such that a given virtual network element (e.g., 630A) includes the control communication and configuration module (e.g., 632A), a set of one or more forwarding table(s) (e.g., 634A), and that portion of the application hardware 610 that executes the virtual network element (e.g., 630A) for supporting the application instance 633A (e.g., vSIM instantiation, remote provisioning, call/session routing, call/session prioritization, caller query logic and integrated messaging, and the like in relation to a messaging subsystem virtualization).

In an example implementation, the special-purpose network device 602 is often physically and/or logically considered to include: (1) a ND control plane 624 (sometimes referred to as a control plane) comprising the compute resource(s) 612 that execute the control communication and configuration module(s) 632A-R; and (2) a ND forwarding plane 626 (sometimes referred to as a forwarding plane, a data plane, or a media or bearer plane) comprising the forwarding resource(s) 614 that can utilize the forwarding or destination table(s) 634A-R and the physical NIs 616. By way of example, where the ND is an entity configured to facilitate service sharing, the ND control plane 624 (the compute resource(s) 612 executing the control communication and configuration module(s) 632A-R) is typically responsible for participating in controlling how bearer traffic (e.g., voice/data/video) is to be routed. Likewise, ND forwarding plane 626 is responsible for receiving that data on the physical NIs 616 and forwarding that data out the appropriate ones of the physical NIs 616 based on the forwarding information.

FIG. 6B illustrates an exemplary way to implement the special-purpose network device 602 according to some embodiments of the invention, wherein an example special-purpose network device includes one or more cards 638 (typically hot-pluggable) coupled to an interconnect mechanism. While in some embodiments the cards 638 are of two types, one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 6 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650, e.g., general purpose operating system software. During operation, the processor(s) 642 execute the software 650 to instantiate one or more sets of one or more applications 664A-R with respect to facilitating subscriber-driven service sharing, for example, including vSIM instantiation, SIM binding, authentication/authorization, remote provisioning, etc. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 654 represents a hypervisor (sometimes referred to as a virtual machine monitor (VMM)) or a hypervisor executing on top of a host operating system; and (2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 1060A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as NFV architecture, as mentioned previously in the present patent disclosure. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 662A-R differently. For example, while embodiments of the invention may be practiced in an arrangement wherein each software container 662A-R corresponds to one VNE 660A-R, alternative embodiments may implement this correspondence at a finer level granularity (e.g., line card virtual machines virtualize line cards, control card virtual machines virtualize control cards, etc.). It should be understood that the techniques described herein with reference to a correspondence of software containers 662A-R to VNEs also apply to embodiments where such a finer level of granularity is used.

In certain embodiments, the virtualization layer 654 may include a virtual switch that provides similar forwarding services as a physical Ethernet switch. Specifically, this virtual switch forwards traffic between software containers 662A-R and the NIC(s) 644, as well as optionally between the software containers 662A-R. In addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 602) could provide for para-virtualization to the application-specific hardware present in the hybrid network device 606 for effectuating a particular embodiment of a subscriber-driven service sharing scenario.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNE(s) 660A-R, and those in the hybrid network device 606) receives data on the physical NIs (e.g., 616, 646) and forwards that data out the appropriate ones of the physical NIs (e.g., 616, 646) for routing a call/session pursuant to a shared service/plan of a host subscriber.

Based on the foregoing, it should be appreciated that embodiments of the present invention enable subscribers and customers to provide the convenience of sharing a service to their friends and family in a timely fashion using relatively simple processes in the event the guests are unable to use their own service (e.g., due to service outage, poor network quality, outside of coverage area, low battery on the device, etc.). Further, while not specifically described, an implementation of the present invention can provide a revenue opportunity for service providers by way of offering a service sharing service to its subscribers depending on billing arrangements for shared services.

Additional benefits and advantages of the present invention may be appreciated in view of the various deficiencies of existing solutions as exemplified below. For instance, existing family plans and their setup need operator assistance and take considerable amount of time. A family plan may typically require that multiple SIM cards issued to family members all be registered in one account associated with the registered plan purchaser. From a billing viewpoint, this requires subscription and charging information to be aggregated for all the SIMs for billing purposes. Adding a family member to the plan requires fairly extensive interaction with the operator's customer service personnel, and/or a trip to the store or a wait for the new SIM to arrive by mail. Also, it should be appreciated that roaming services are often expensive when available. Usually, if a roaming agreement exists between the subscriber's home service provider and a provider in the visited location, the purchase of such a service is expensive. This often dissuades subscribers from purchasing a roaming service. On the other hand, purchasing a local SIM can be difficult, especially when traveling to a foreign country. To avoid purchasing a roaming service prior to travel, subscribers often purchase a pre-paid local SIM when possible. In many regions and countries, this is not easy for visitors since it is not clear where to purchase. Even if it is evident, there can still be hurdles. For instance, regulations in India require proof of local residence, photographs, other documentation, etc. in order to prevent SIMs from being inadvertently sold to malevolent elements. Additionally, switching SIMs on a subscriber device can be inconvenient. In the first place, switching the SIM out of a phone works only if the phone is carrier unlocked. This is often not the case for on-contract phones. When a phone is indeed unlocked from the home carrier, it might be a small task for the user to switch the SIM but it is still an annoyance. Sometimes the SIMs are not of the same size, which may require an adapter or cutting a SIM card to size. For temporary uses such as roaming, it also means that the user loses the home service number or settings when the handset is dual SIM capable, and has to refresh them when switching back. Moreover, the operator incurs transaction costs on the control and management planes due to re-authentication etc. Those skilled in the art can readily recognize upon reference hereto that an embodiment of the present invention involving service sharing can advantageously overcome the foregoing shortcomings, among others.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A system for facilitating service sharing in a network environment, comprising:
   one or more processors; and
   a persistent memory module coupled to the one or more processors, the persistent memory module including program instructions for performing, when executed by the one or more processors:
   upon receiving a request from a host subscriber for instantiating a virtual subscriber identification module (vSIM), authenticating the host subscriber by a host service provider network and generating a vSIM populated with a service profile of the host subscriber with respect to one or more host services to which the host subscriber has a subscription and is requesting to share;
   associating the vSIM to at least one of a host subscriber device and a guest subscriber device;
   upon receiving credentials of a guest user, performing guest registration and remote provisioning for the vSIM, the remote provisioning including allocation of a temporary phone number and an Internet Protocol (IP) address that are attached to a vSIM-based host service and creating one or more mapping relationships relative to the temporary phone number and IP address for a duration of time; and
   propagating at least one of the mapping relationships to one or more location and routing databases of at least one of the host service provider network and a guest service provider network for facilitating routing of calls for the guest user using the vSIM-based host service.

2. The system as recited in claim 1, wherein the vSIM is provided as a cloud SIM in a cloud-based service platform, the cloud SIM being identified with at least one of the host subscriber device or the guest subscriber device in the cloud-based service platform.

3. The system as recited in claim 1, wherein the vSIM is associated with at least one of the host subscriber device and the guest subscriber device by respectively downloading the vSIM to the host subscriber device or the guest subscriber device.

4. The system as recited in claim 1, wherein the vSIM-based host service comprises at least one of a voice service, a data service, a video service, a circuit-switched network service, a packet-switched network service, a Voice-Over-IP (VOIP) service, and an Over-The-Top (OTT) communications service.

5. The system as recited in claim 1, wherein the duration of time comprises a timing window that is at least one of manually configured, automatically configured, an unbounded amount of time, an extendable timing window having a system override, and a preconfigured duration received via an input from at least one of the host subscriber and the guest user.

6. The system as recited in claim 1, wherein the one or more mapping relationships involving at least one of the temporary phone number and IP address is terminated in a deregistration process upon receiving a termination message from at least one of (i) the host subscriber, (ii) the guest user, (iii) a management entity in the host service provider network, (iv) a management entity of the guest service provider network, and (v) a timeout mechanism.

7. The system as recited in claim 1, wherein the remote provisioning is performed responsive to at least one of authenticating the guest user with the guest service provider network and determining that the host service provider network and the guest service provider network have a service sharing arrangement.

8. The system as recited in claim 1, wherein the guest user's credentials comprise at least one of a name, identity, telephone number, Personal Identification Number (PIN), password, and authentication indicia of the guest user.

9. The system as recited in claim 1, wherein the program instructions are further configured to create one or more vSIMs every time a service sharing is initiated for one or more guest users.

10. A method for facilitating service sharing in a network environment, the method comprising:
   upon receiving a request from a host subscriber for instantiating a virtual subscriber identification module (vSIM), authenticating the host subscriber by a host service provider network and generating a vSIM populated with a service profile of the host subscriber with respect to one or more host services to which the host subscriber has a subscription and is requesting to share;

associating the vSIM to at least one of a host subscriber device and a guest subscriber device;

upon receiving credentials of a guest user, performing guest registration and remote provisioning for the vSIM, the remote provisioning including allocation of a temporary phone number and an Internet Protocol (IP) address that are attached to a vSIM-based host service and creating one or more mapping relationships relative to the temporary phone number and IP address for a preconfigured duration of time; and propagating at least one of the mapping relationships to one or more location and routing databases of at least one of the host service provider network and a guest service provider network for facilitating routing of calls for the guest user using the vSIM-based host service.

11. The method as recited in claim 10, wherein the vSIM is provided as a cloud SIM in a cloud-based service platform, the cloud SIM being identified with the host subscriber device in the cloud-based service platform.

12. The method as recited in claim 10, wherein associating the vSIM with at least one of the host subscriber device and the guest subscriber device comprises respectively downloading the vSIM to the host subscriber device or the guest subscriber device.

13. The method as recited in claim 10, wherein the vSIM-based host service comprises at least one of a voice service, a data service, a video service, a circuit-switched network service, a packet-switched network service, a Voice-Over-IP (VOIP) service, and an Over-The-Top (OTT) communications service.

14. The method as recited in claim 10, wherein the duration of time comprises a timing window that is at least one of manually configured, automatically configured, an unbounded amount of time, an extendable timing window having a system override, and a preconfigured duration received via an input from at least one of the host subscriber and the guest user.

15. The method as recited in claim 10, further comprising terminating the one or more mapping relationships involving at least one of the temporary phone number and IP address in a deregistration process upon receiving a termination message from at least one of (i) the host subscriber, (ii) the guest user, (iii) a management entity in the host service provider network, (iv) a management entity of the guest service provider network, and (v) a timeout mechanism.

16. The method as recited in claim 10, wherein the remote provisioning is performed responsive to at least one of authenticating the guest user with the guest service provider network and determining that the host service provider network and the guest service provider network have a service sharing arrangement.

17. The method as recited in claim 10, wherein the guest user's credentials comprise at least one of a name, identity, telephone number, Personal Identification Number (PIN), password, and authentication indicia of the guest user.

18. The method as recited in as recited in claim 10, further comprising:

performing a second guest registration and remote provisioning for the vSIM using another guest's credentials, the remote provisioning including allocation of another temporary phone number and another IP address that are attached to the vSIM-based host service and mapped in an associative relationship relative to another temporary phone number and IP address for another duration of time; and propagating the associative relationship to one or more location and routing databases of at least one of the host service provider network and a service provider network associated with the another guest user's telephone number for facilitating routing of calls for the another guest user using another vSIM-based service that is shared with the host subscriber.

19. The method as recited in claim 18, wherein the another guest user's credentials input comprises at last one of the another guest user's name, identity, telephone number, Personal Identification Number (PIN), password, and authentication indicia.

20. The method as recited in claim 10, further comprising creating one or more vSIMs every time a service sharing is initiated for one or more guest users.

21. A subscriber device, comprising: one or more processors; and a persistent memory module coupled to the one or more processors, the persistent memory module including program instructions for performing, when executed by the one or more processors:

upon receiving an input from a host subscriber, generating a request for instantiating a virtual subscriber identification module (vSIM) to a host service provider network;

receiving a vSIM populated with a service profile of the host subscriber with respect to one or more host services to which the host subscriber has a subscription and requesting to share with one or more guests; and facilitating, using a guest user's credentials input, initiation of a guest registration and remote provisioning process for the vSIM, the remote provisioning including receiving a temporary phone number and an Internet Protocol (IP) address that are attached to a vSIM-based host service and mapped in one or more associative relationships for a duration of time for facilitating routing of calls for the guest user using the vSIM-based host service.

22. The subscriber device as recited in claim 21, wherein the vSIM-based host service comprises at least one of a voice service, a data service, a video service, a circuit-switched network service, a packet-switched network service, a Voice-Over-IP (VOIP) service, and an Over-The-Top (OTT) communications service.

23. The subscriber device as recited in claim 21, wherein the duration of time comprises a timing window that is at least one of manually configured, automatically configured, an unbounded amount of time, an extendable timing window having a system override, and a preconfigured duration received via an input from at least one of the host subscriber and the guest user.

24. The subscriber device as recited in claim 21, further comprising a communications interface operative with a radio access technology compliant with a standard selected from at least one of IEEE 802.11 standard, IEEE 802.16 standard, HiperLan standard, HiperLan II standard, Wi-Max standard, Open Air standard, and Bluetooth standard.

25. The subscriber device as recited in claim 21, further comprising a communications interface operative with a radio access technology compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network, a 4G network, a 5G network, a Next Generation Network (NGN), an Integrated Digital Enhanced Network (IDEN), a Code Division Multiple Access (CDMA) network, a Universal Mobile Telecommunications System (UMTS) network, a Time Division Multiple Access (TDMA) network, and a Long Term Evolution (LTE) network.

26. The subscriber device as recited in claim 21, wherein the guest user's credentials input comprises at least one of a name, identity, telephone number, Personal Identification Number (PIN), password, and authentication indicia of the guest user.

27. The subscriber device as recited in claim 21, further comprising:
- two or more vSIMs, a first one of which comprises the vSIM configured for sharing services and a second one of which comprises a vSIM configured for the guest user's own original services; and
- a user interface configured to receive a user input operative to indicate whether a shared service or an original service is being engaged.

28. The subscriber device as recited in claim 21, further comprising:
- two or more vSIMs, a first one of which comprises the vSIM configured for sharing services and a second one of which comprises a vSIM configured for the host subscriber's own original services; and
- a user interface configured to receive a user input operative to indicate whether a shared service or an original service is being engaged.

\* \* \* \* \*